United States Patent
Hong (10) Patent No.: US 10,834,579 B2
(45) Date of Patent: Nov. 10, 2020

(54) COMMUNICATION METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/349,260

(22) PCT Filed: Nov. 14, 2016

(86) PCT No.: PCT/CN2016/105648
§ 371 (c)(1),
(2) Date: May 10, 2019

(87) PCT Pub. No.: WO2018/086097
PCT Pub. Date: May 17, 2018

(65) Prior Publication Data
US 2019/0268761 A1    Aug. 29, 2019

(51) Int. Cl.
*H04W 8/30* (2009.01)
*H04W 40/02* (2009.01)
*H04W 4/18* (2009.01)
*H04W 88/06* (2009.01)

(52) U.S. Cl.
CPC .............. *H04W 8/30* (2013.01); *H04W 4/18* (2013.01); *H04W 40/02* (2013.01); *H04W 88/06* (2013.01)

(58) Field of Classification Search
CPC ......... H04W 8/30; H04W 4/18; H04W 40/02; H04W 88/06
See application file for complete search history.

(56) References Cited

U.S. PATENT DOCUMENTS

| | | | |
|---|---|---|---|
| 2012/0224528 A1 | 9/2012 | Tapia | |
| 2015/0173004 A1* | 6/2015 | Nigam | H04W 48/16 370/331 |
| 2017/0041900 A1* | 2/2017 | Wallentin | H04W 68/02 |
| 2017/0111886 A1* | 4/2017 | Kim | H04W 72/042 |
| 2018/0184480 A1* | 6/2018 | Chandramouli | H04W 48/12 |
| 2019/0037640 A1* | 1/2019 | Xiong | H04B 7/0626 |
| 2019/0208380 A1* | 7/2019 | Shi | H04L 12/1407 |

FOREIGN PATENT DOCUMENTS

| | | |
|---|---|---|
| CN | 101471877 A | 7/2009 |
| CN | 102595510 A | 7/2012 |
| CN | 103024853 A | 4/2013 |

OTHER PUBLICATIONS

International Search Report (including English translation) and Written Opinion of PCT/CN2016/105648, dated Jul. 27, 2017, 13 pages.

* cited by examiner

*Primary Examiner* — Dinh Nguyen
(74) *Attorney, Agent, or Firm* — Arch & Lake LLP (57) ABSTRACT

A method for communpication is provided. The method includes receiving data sent by a user equipment (UE); determining a core network which provides a communication service for the UE; performing data format conversion on the data when the core network is a next generation core (NG-Core) to obtain designated data, where the obtained designated data has a data format is consistent with the data format of the NG-Core, and sending the designated data to the NG-Core; and sending the data to an EPC when the core network is the fourth-generation EPC.

6 Claims, 7 Drawing Sheets

COMMUNICATION METHOD AND DEVICE

CROSS REFERENCE TO RELATED APPLICATIONS

This application claims priority to International Application No. PCT/CN2016/105648, filed on Nov. 14, 2016, the entire disclosure of which is incorporated herein by reference in its entirety for all purposes.

TECHNICAL FIELD

The present disclosure relates to the field of mobile communication technologies, and in particular, to a communication method and device.

BACKGROUND

In the past 30 years, the mobile communication has undergone the leap development from voice services to mobile bandwidth services, which has not only profoundly changed people's lifestyles, but also greatly promoted social and economic development.

SUMMARY

The present disclosure provides a method and one or more device for communication.

According to one aspect, a method for communication is provided. The method may include: receiving data sent by a user equipment (UE); determining a core network which provides a communication service for the UE; and when the core network is a next generation core network (NG-Core), performing a data format conversion on the data to obtain designated data where the obtained designated data has a data format that is consistent with the NG-core, and sending the designated data to the NG-core; and when the core network is a fourth-generation evolved packet core (EPC), sending the data to the fourth-generation EPC.

According to another aspect, a device for communication is provided. The device may include: a processor; and a memory for storing a processor-executable instruction, where the processor may be configured to: receive data from a user equipment (UE); determine a core network which provides a communication service for the UE; and when the core network is a next generation core (NG-Core), perform a data format conversion on the data to obtain designated data where the obtained designated data has a data format that is consistent with the NG-Core, and send the designated data to the NG-Core; and when the core network is a fourth-generation evolved packet core (EPC), send the data to the fourth-generation EPC.

According to a further aspect, a device for communication is provided. The device may include: a processor; and a memory for storing a processor-executable instruction, where the processor may be configured to: receive data from a core network, wherein the core network is a core network which provides a communication service for a user equipment (UE); and when the core network is a next generation core (NG-Core), perform a data format conversion on the data to obtain designated data where the obtained designated data has a data format that is consistent with the UE, send the designated data to the UE; and when the core network is a fourth-generation evolved packet core (EPC), send the data to the UE.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of the present disclosure, illustrate examples consistent with the disclosure and, together with the description, serve to explain the principles of the disclosure.

DETAILED DESCRIPTION

Reference will now be made in detail to some examples, examples of which are illustrated in the accompanying drawings. The following description refers to the accompanying drawings in which the same numbers in different drawings represent the same or similar elements unless otherwise represented. The implementations set forth in the following description of some examples do not represent all implementations consistent with the disclosure. Instead, they are merely examples of apparatuses and methods consistent with aspects related to the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In a fourth-generation mobile communication technology (4G, or 4th-Generation) communication system, a user equipment (UE) sends data to a base station. After receiving the data, the base station sends the data to an evolved packet core (EPC), i.e., a 4G core, so that the UE may communicate with the core.

The development of fifth-generation mobile communication technology (5G, or 5th-Generation) has undertaken, and the EPC may be replaced when the deployment of a next generation core (NG-Core) is completed.

The present disclosure has provided that, since a data format supported by the NG-Core is different from that of a Long-term Evolution (LTE) communication system, there is an urgent need for a method which may support the communication between the UE and the EPC, and may also support the communication between the UE and the NG-Core when the deployment of the NG-Core is completed, thereby achieving seamless connection between 4G and 5G.

Figure 1:
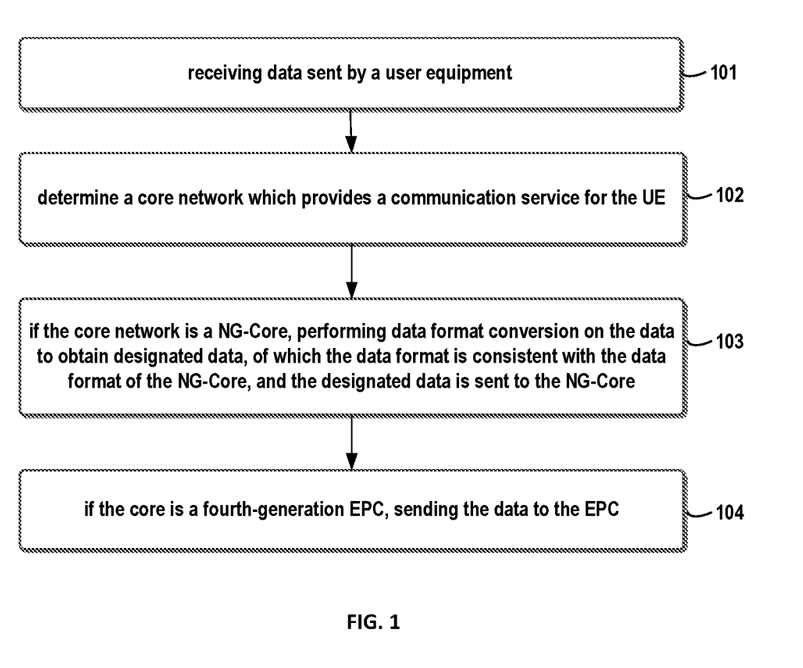
FIG. 1 is a flow chart showing a method for communication according to some examples.

FIG. 1 is a flow chart showing a method for communication according to some examples. As shown in FIG. 1, this example is applied to a base station and specifically includes the following steps.

In step 101, receiving data sent by a user equipment (UE).

In step 102, determine a core network which provides a communication service for the UE.

In step 103, if the core network is a next generation core (NG-Core), performing data format conversion on the data to obtain designated data, of which the data format is consistent with the data format of the NG-Core, and the designated data is sent to the NG-Core.

In step 104, if the core network is a fourth-generation EPC, sending the data to the EPC.

In some examples of the present disclosure, if the core network is the EPC, the base station may send the data received from the UE to the EPC; and if the core network is the NG-Core, the base station may perform data format conversion on the data received from the UE to obtain the designated data, of which the data format is consistent with the data format of the NG-Core, and then sends the designated data to the NG-Core. Therefore, the base station may achieve the communication between the UE and the EPC, and may also support the communication between the UE and the NG-Core when the deployment of the NG-Core is completed, thereby achieving seamless connection between 4G and 5G.

In some examples, the data is user data, the step of performing data format conversion on the data to obtain designated data, of which the data format is consistent with the data format of the NG-core includes:

performing data format conversion on the user data in a packet data convergence protocol (PDCP) layer to obtain designated data, of which the data format is consistent with the user data format of the NG-Core.

In some examples, the data is signaling data, the step of performing data format conversion on the data to obtain designated data, of which the data format is consistent with the data format of the NG-Core includes:

performing data format conversion on the signaling data in a radio resource control (RRC) layer to obtain designated data, of which the data format is consistent with the signaling data format of the NG-Core.

In some examples, the data format refers to the number of fields, field length, an arrangement order of fields, or meaning of fields in the data.

Examples of the present disclosure may be formed by possible combinations of the above optional technical solutions, which is not described herein.

Figure 2:
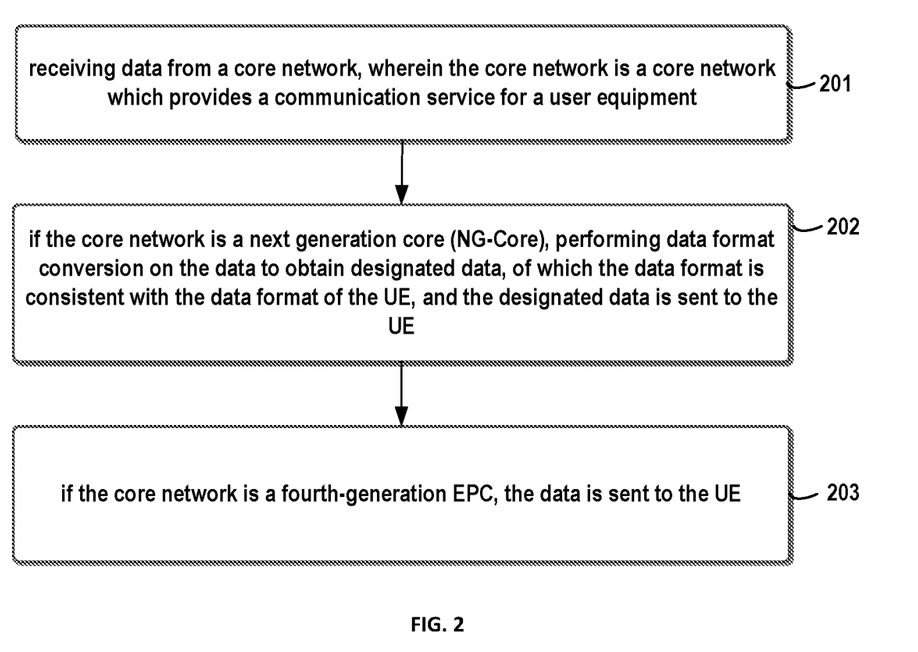
FIG. 2 is a flow chart showing a method for communication according to some examples.

FIG. 2 is a flow chart showing a method for communication according to some examples. As shown in FIG. 2, this example is applied to a base station and specifically includes the following steps.

In step 201, receiving data from a core network, wherein the core network is a core network which provides a communication service for a user equipment (UE).

In step 202, if the core network is a next generation core (NG-Core), performing data format conversion on the data to obtain designated data, of which the data format is consistent with the data format of the UE, and sending the designated data to the UE.

In step 203, if the core network is a fourth-generation EPC, sending the data the UE.

In the examples of the present disclosure, if the core network is the EPC, the base station may send data received from the EPC to the UE; and if the core network is the NG-Core, the base station may perform data format conversion on the data received from the NG-Core to obtain the designated data, of which the data format is consistent with the data format of the UE, and then sends the designated data to the UE. Therefore, the base station may support the communication between the UE and the EPC, and may also support the communication between the UE and the NG-Core when the deployment of the NG-Core is completed, thereby achieving seamless connection between 4G and 5G.

In some examples, the data is user data, and the step of performing data format conversion on the data to obtain designated data, of which the data format is consistent with the data format of the UE, includes:

performing data format conversion on the user data in a packet data convergence protocol (PDCP) layer to obtain the designated data, of which the data format is consistent with the user data format of the UE.

In some examples, the data is signaling data, the step of performing data format conversion on the data to obtain designated data, of which the data format is consistent with the data format of the UE includes:

performing data format conversion on the signaling data in a radio resource control (RRC) layer to obtain designated data, of which the data format is consistent with the signaling data format of the UE.

In some examples, the data format refers to the number of fields, field length, an arrangement order of fields, or meaning of fields in the data.

Examples of the present disclosure may be formed by possible combinations of the above optional technical solutions, which is not described herein.

Figure 3:
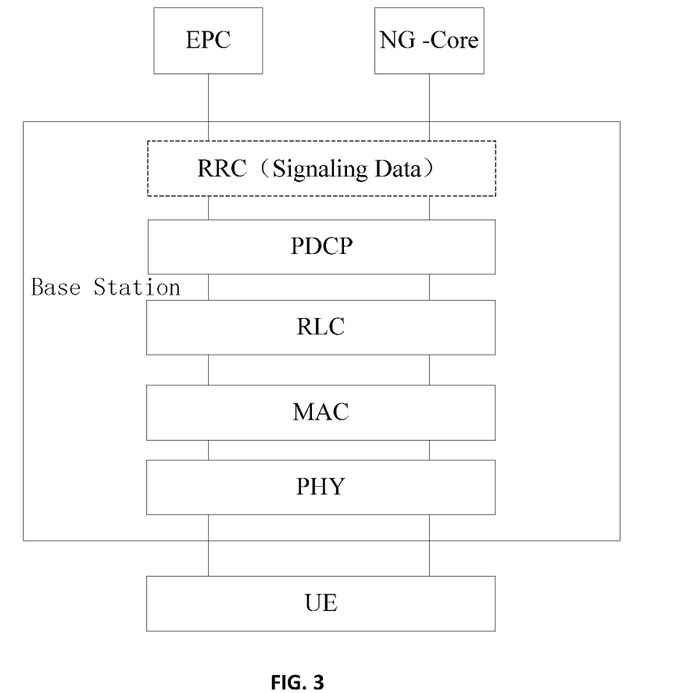
FIG. 3 is a structural diagram showing a system for communication according to some examples.

FIG. 3 is a structural diagram showing a communication system according to some examples. As shown in FIG. 3, the communication system includes a base station, a user equipment (UE) and a core network.

The base station refers to a base station deployed in an evolved Long-term Evolution (eLTE) communication system.

The core network is deployed by a telecomm carrier, may be an EPC and may also be an NG-Core.

The UE may be a UE in an LTE communication system and may also be an evolved user equipment (eUE) in the eLTE communication system. The UE capability grade, such as a transport rate and a modulation mode, of the eUE is higher than that of the UE in the LTE communication system, but they use the same data format.

If the core network is the EPC, the base station supports the communication between the UE and the EPC. After the telecomm carrier deploys the NG-Core, the NG-Core will replace the EPC. At this time, the base station enables the format of the data sent to the UE (or the NG-Core) and the data format used by the UE (or the NG-Core) to be consistent by performing data format conversion on the received data, and thus also supports the communication between the UE and the NG-Core.

In a practical communication scenario, if the data is user data, the data may be processed in a physical (PHY) layer, a media access control (MAC) layer, a radio link control (RLC) layer and a packet data convergence protocol (PDCP) layer of the base station.

If the data is signaling data, the data may be processed in the PHY, the MAC, the RLC, the PDCP and a radio resource control (RRC) layer of the base station.

Based on the communication system provided in FIG. 3, there may be four possible communication scenarios between the UE and the core:

1. the UE communicates with the core network through the base station by a uplink communication; and 2. the UE communicates with the core network through the base station by a downlink communication.

Figure 4:
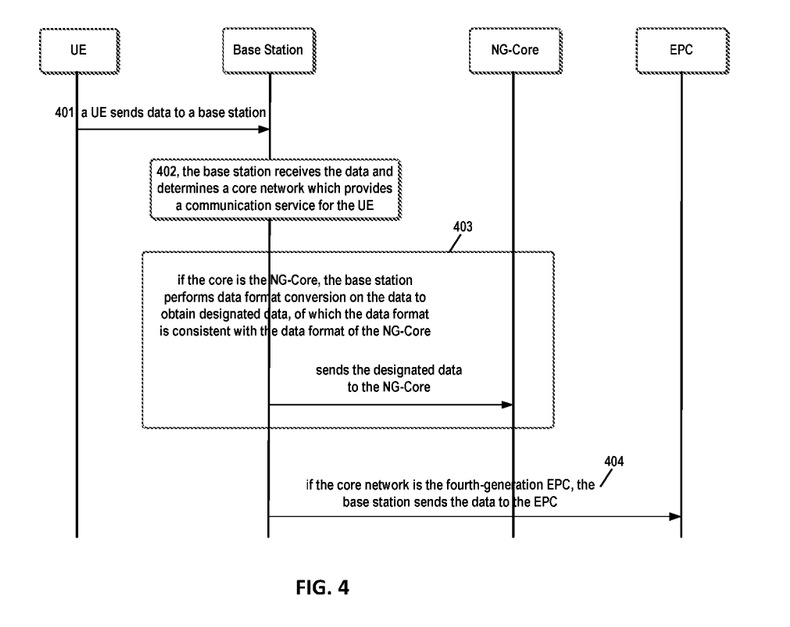
FIG. 4 is a flow chart showing a method for communication according to some examples.
Figure 5:
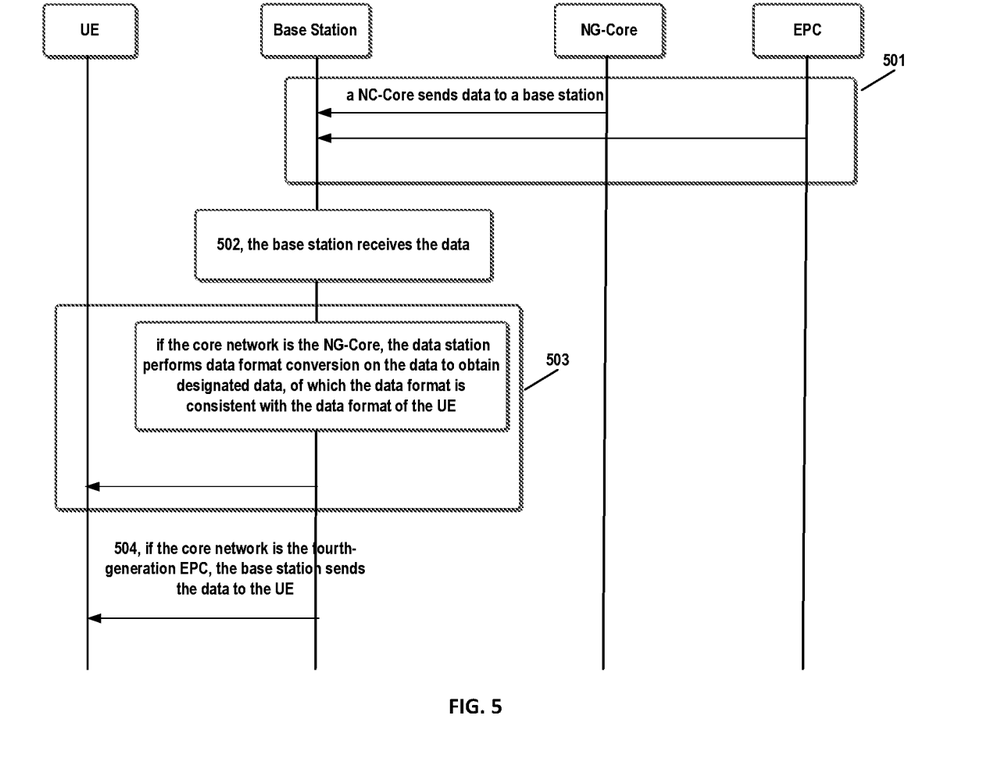
FIG. 5 is a flow chart showing a method for communication according to some examples.

Therefore, the communication process in the communication system is illustrated in some examples of FIG. 4 and FIG. 5 respectively. FIG. 4 is a flow chart showing a method for communication according to some examples. As shown in FIG. 4, the method specifically includes the following steps.

In step 401, a UE sends data to a base station.

The data is user data or signaling data. The user data is the data required by a user in a communication service or the data uploaded to a core network by the user and is not limited to voice data or picture data. The signaling data is used for controlling the communication process and is not limited to connection control signaling. Generally, the data includes a data type field. The data type field is used to indicate that the data is the user data or the signaling data.

In this step, the UE sends, in its own PHY, the data to the base station.

In step 402, the base station receives the data and determines a core network which provides a communication service for the UE.

In fact, the data is received in the PHY of the base station, and is processed in the following order: the PHY, the MA, the RLC, the PDCP and the RRC, respectively. A specific processing procedure is not limited in the examples of the present disclosure. For example, decoding and demodulation are performed on the received data in the PHY; uplink scheduling information, including the size of data to be sent and uplink power headroom, of the UE is measured in the MAC; the data is checked and recombined in the RLC; and further, data integrity verification is performed in the PDCP. If the data is the signaling data, the data is further processed in the RRC of the base station, which includes processing of paging signaling or a radio bearer.

When the base station receives the data, the base station may automatically determine the core network which provides the communication service for the UE. A determination mode is not limited in some examples of the present disclosure. For example, the core network is determined according to the connection between the base station and the core network. If the base station is connected to a next-generation core (NG-Core), it may be determined that the core network which provides the communication service for the UE is the NG-Core. If the base station is connected to a fourth-generation EPC, it may be determined that the core which provides the communication service for the UE is the EPC.

In step 403, if the core network is the NG-Core, the base station performs data format conversion on the data to obtain designated data, of which the data format is consistent with the data format of the NG-Core, and sends the designated data to the NG-Core.

After the deployment of the NG-Core is completed, the EPC will be replaced by the NG-Core. Therefore, the base station sends the received data to the NG-Core. However, the data format used by the NG-Core is different from the data format used by the UE. Therefore, in order to guarantee the communication, the base station may perform data format conversion on the data according to the configured corresponding relationship between the data formats, thereby obtaining designated data, of which the data format is consistent with that of the NG-Core. Further, the base station may send the designated data to the NG-Core through a deployed connection relationship with the NG-Core.

The data format is not limited to the number of fields, field length, an arrangement order of fields, or meaning of fields in the data. For example, the data is the signaling data. The data formats of the signaling data and the designated data may be as shown in table 1:

TABLE 1

| Signaling data | | | Designated data | | |
|---|---|---|---|---|---|
| Field number | Field length (Bit) | Meaning of the fields | Field number | Field length (Bit) | Field meaning |
| A1 | 8 | Flag bit 1 | B1 | 16 | Flag bit 1 |
| A2 | 16 | verification bit | B2 | 16 | verification bit |
| A3 | 8 | Signaling information | B3 | 4 | Priority information |
| A4 | 8 | Service information | B4 | 16 | Signaling information |
| A5 | 1 | Forward indicator | B5 | 16 | Service information |
| A6 | 7 | Forward sequence number | B6 | 1 | Forward indicator |
| A7 | 1 | Backward indicator | B7 | 7 | Forward sequence number |
| A8 | 7 | Backward sequence number | B8 | 1 | Backward indicator |
| A9 | 8 | Flag bit 2 | B9 | 7 | Backward sequence number |
| | | | B10 | 16 | Flag bit 2 |

With reference to table 1, the flag bit 1 is used to indicate a start position of data; the verification bit is used to verify data integrity; the signaling information is used to indicate the data type (such as Signaling System No. 7); the service information is used to indicate the service type of the data (such as domestic messages or foreign messages); the forward indicator and the backward indicator are used to indicate whether the data is retransmitted; and the forward sequence number and the backward sequence number are used to indicate the sequence number that a sender or a receiver transfers the data. In addition, the priority information of the designated data is used to indicate the priority for processing the data; when the data format conversion is performed, the base station may make a determination according to the configured corresponding relationship between the priority information and the signaling information.

It should be noted that the layer, in which the data format conversion is performed, is not limited in some examples of the present disclosure. For example, the higher layer of the base station may directly interact with the NG-Core, therefore, on the basis of guaranteeing the normal function of each layer, the process of data format conversion may be performed in the high layer of the base station: if the data is user data, the data format conversion may be performed in the PDCP of the base station; and if the data is signaling data, the data format conversion may be performed in the RRC.

In step 404, if the core network is the fourth-generation EPC, the base station sends the data to the EPC.

Before the deployment of the NG-Core is completed, the EPC provides the communication service for the UE. Since the consistent data formats applied in both the EPC and the UE is the same, the base station may send the data to the EPC through the deployed connection relationship with the EPC when receiving the data of the UE.

It should be noted that step 403 and step 404 above are independent of a time sequence that the method for communication is performed, but are intended to reflect the method for communication which may be provided under this communication system. This method for communication may adapt to both the LTE communication system and the next generation communication system (such as 5G). Step 503 and step 504 of the example of FIG. 5 below are similar to step 403 and step 404.

In addition, the mode of triggering the data format conversion is not limited in some examples of the present disclosure. For example, since connections between the base station and EPC as well as between the base station and the NG-Core, which are deployed by the telecom carrier, are different (physical connection or logical connection), when the deployment of the NG-Core is completed, the base station is connected to the NG-Core and automatically triggers the process of performing data format conversion on the received data. Again for example, a data format conversion trigger is arranged in the base station, and if the core network is the EPC, the data format conversion trigger is disabled, so that the base station may directly send the data to the EPC when receiving the data sent by the UE; and if the core network is the NG-Core, the data format conversion trigger is enabled, so that the base station may perform data format conversion on the data when receiving the data and then sends the designated data obtained through data format conversion to the NG-Core. The following triggering mode in the example of FIG. 5 is similar to this.

In the examples of the present disclosure, if the core network is the EPC, the base station may send the received data of the UE to the EPC; and if the core network is the NG-Core, the base station may perform data format conversion on the data received from the UE to obtain the designated data, of which the data format is consistent with the data format of the NG-Core, and then sends the designated data to the NG-Core. Therefore, the base station may support the communication between the UE and the EPC, and may also support the communication between the UE and the NG-Core when the deployment of the NG-Core is completed, thereby meeting seamless connection between 4G and 5G.

FIG. 5 is a flow chart showing a method for communication according to some examples. As shown in FIG. 5, this example may be applied to the communication system shown in FIG. 3 and specifically includes the following steps.

In step 501, a core network sends data to a base station, wherein the core network is a core network which provides a communication service for a user equipment (UE).

The data has been described in step 401 and is not described herein. No matter whether the core network is the EPC or the NG-Core, the data may be sent to the base station through a connection relationship, deployed by a telecom carrier, with the base station.

In step 502, the base station receives the data.

Corresponding to the example of FIG. 4, the data may be signaling data and may also be user data. When receiving the data, the base station determines the data type of the data according to a data type field included in the data. If the data is the signaling data, the data may be processed in the following layers in order: the RRC, the PDCP, the RLC, the MAC and the PHY; and if the data is the user data, the data may be processed in the following layers in order: the PDCP, the RLC, the MAC and the PHY.

In step 503, if the core network is the next generation core (NG-Core), the data station performs data format conversion on the data to obtain designated data, of which the data format is consistent with the data format of the UE, and sends the designated data to the UE.

This step is similar to step 403, but the data format conversion is reverse of that in step 403. For example, according to the data format corresponding relationship configured by the base station, the signaling data is converted, in the RRC of the base station, to the designated data, of which the data format is consistent with the data format of the UE, and the designated data is processed in the layers in order, and then is sent to the UE in the PHY. Or the user data is converted, in the PDCP of the base station, to the designated data, of which the data format is consistent with the data format of the UE, and the designated data is processed in each layer and then is sent to the UE in the PHY.

In step 504, if the core network is the fourth-generation EPC, the base station sends the data to the UE.

Since the consistent data format applied in the EPC and the UE is the same, the base station may directly send the data to the UE when receiving the data from the EPC.

In some examples of the present disclosure, if the core network is the EPC, the base station may send the data received from the EPC to the UE, and if the core network is the NG-Core, the base station may perform data format conversion on the data received from the NG-Core to obtain the designated data, of which the data format is consistent with the data format of the UE, and then sends the designated data to the UE. Therefore, the base station may support the communication between the UE and the EPC, and may also support the communication between the UE and the NG-Core when the deployment of the NG-Core is completed, thereby achieving seamless connection between 4G and 5G.

Figure 6:
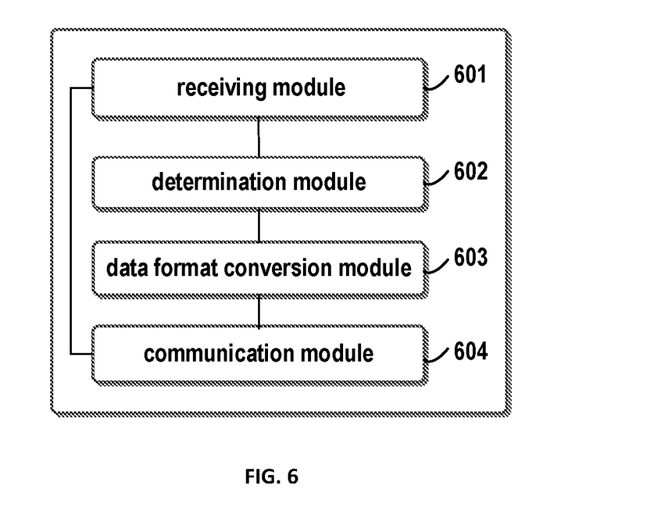
FIG. 6 is a block diagram showing a device for communication according to some examples.

FIG. 6 is a block diagram of showing a device for communication according to some examples. With reference to FIG. 6, the device includes a receiving module 601, a determination module 602, a data format conversion module 603 and a communication module 604.

The receiving module 601 is configured to receive data sent by a user equipment (UE).

The determination module 602 is configured to determine a core network which provides a communication service for the UE.

The data format conversion module 603 is configured to perform data format conversion on the data received by the receiving module 601 if the core network is a next generation core (NG-Core) to obtain designated data, of which the data format is consistent with the data format of the NG-Core.

The communication module 604 is configured to send the designated data obtained by the data format conversion module 603 to the NG-Core.

The communication module 604 is further configured to send the data received by the receiving module 601 to an EPC if the core network is the fourth-generation EPC.

In some examples of the present disclosure, if the core network is the EPC, the base station may send the data received from the UE to the EPC; and if the core network is the NG-Core, the base station may perform data format conversion on the data received from the UE to obtain the designated data, of which the data format is consistent with the data format of the NG-Core, and then sends the designated data to the NG-Core. Therefore, the base station may support the communication between the UE and the EPC, and may also support the communication between the UE and the NG-Core when the deployment of the NG-Core is completed, thereby achieving seamless connection between 4G and 5G.

In some examples, the data is user data. Based on the constitution of the device of FIG. 6 and with reference to FIG. 7, the data format conversion module 603 includes a first data format conversion unit 603A.

Figure 7:
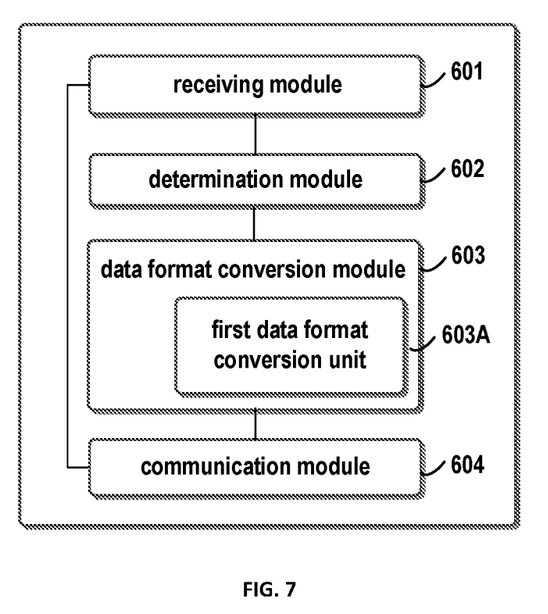
FIG. 7 is a block diagram showing a device for communication according to some examples.

The first data format conversion unit 603A is configured to perform data format conversion on the user data in a packet data convergence protocol (PDCP) layer to obtain designated data, of which the data format is consistent with the user data format of the NG-Core.

In some examples, the data is signaling data. Based on the constitution of the device of FIG. 6 and with reference to FIG. 8, the data format conversion module 603 includes a second data format conversion unit 603B.

Figure 8:
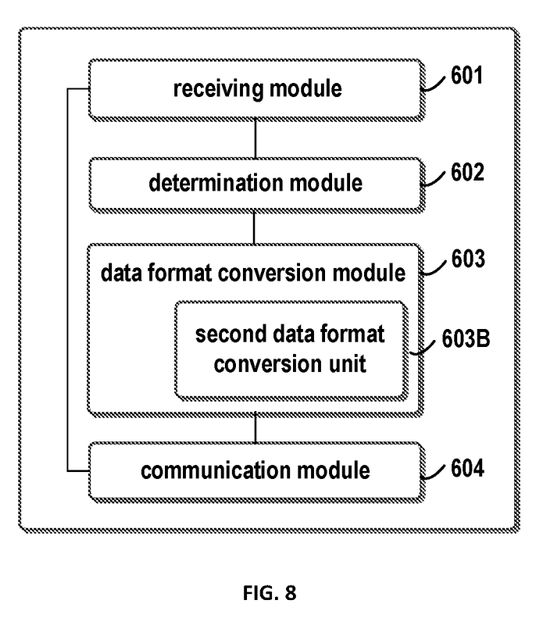
FIG. 8 is a block diagram showing a device for communication according to some examples.

The second data format conversion unit 603B is configured to perform data format conversion on the signaling data at a radio resource control (RRC) layer to obtain designated data, of which the data format is consistent with the signaling data format of the NG-Core.

In some examples, the data format refers to the number of fields, field length, an arrangement order of fields, or meaning of fields in the data.

Examples of the present disclosure may be formed by possible combinations of the above optional technical solutions, which is not described herein.

Figure 9:
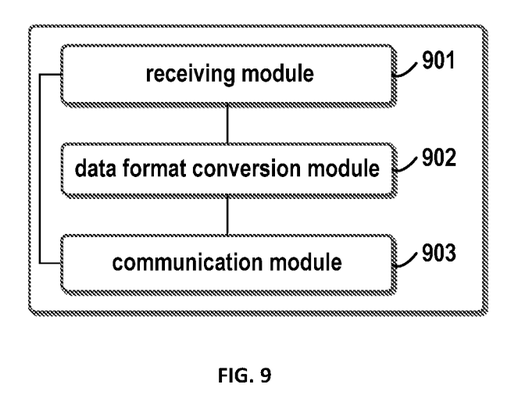
FIG. 9 is a block diagram showing a device for communication according to some examples.

FIG. 9 is a block diagram showing a device for communication according to some examples. With reference to FIG. 9, the device includes a receiving module 901, a data format conversion module 902 and a communication module 903.

The receiving module 901 is configured to receive data sent by a core network, wherein the core network is a core network which provides a communication service for a user equipment (UE).

The data format conversion module 902 is configured to perform data format conversion on the data if the core network is a next generation core (NG-Core) to obtain designated data, of which the data format is consistent with the data format of the UE.

The communication module 903 is configured to send the designated data obtained by the data format conversion module 902 to the UE.

The communication module 903 is further configured to send the data received by the receiving module 901 to the UE if the core network is a fourth-generation EPC.

In some examples of the present disclosure, if the core network is the EPC, the base station may send the data received from the EPC to the UE, and if the core network is the NG-Core, the base station may perform data format conversion on the data received from the NG-Core to obtain the designated data, of which the data format is consistent with the data format of the UE, and then sends the designated data to the UE. Therefore, the base station may support the communication between the UE and the EPC, and may also support the communication between the UE and the NG-Core when the deployment of the NG-Core is completed, thereby achieving seamless connection between 4G and 5G.

In some examples, the data is user data. Based on the constitution of the device of FIG. 9 and with reference to FIG. 10, the data format conversion module 902 includes a first data format conversion unit 902A.

Figure 10:
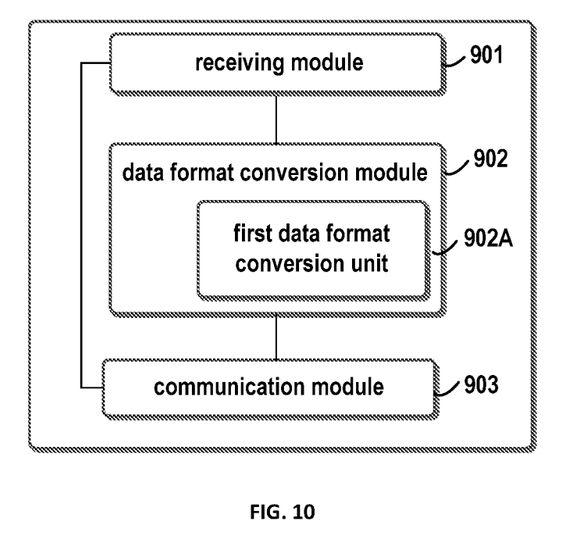
FIG. 10 is a block diagram showing a device for communication according to some examples.

The first data format conversion unit 902A is configured to perform data format conversion on the user data at a packet data convergence protocol (PDCP) layer to obtain designated data, of which the data format is consistent with the user data format of the UE.

In some examples, the data is signaling data. Based on the constitution of the device of FIG. 9 and with reference to FIG. 11, the data format conversion module 902 includes a second data format conversion unit 902B.

Figure 11:
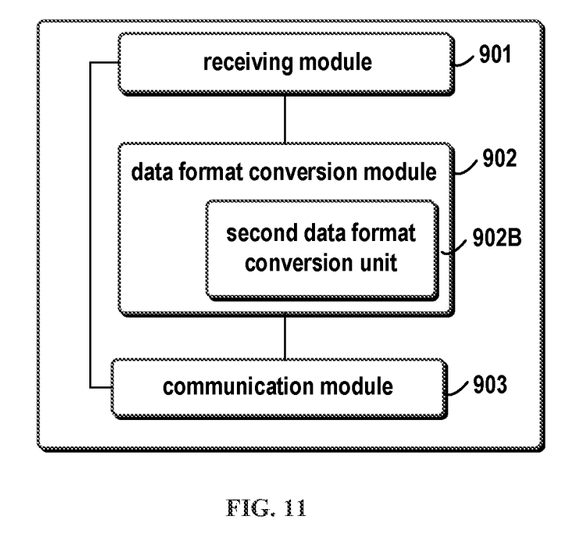
FIG. 11 is a block diagram showing a device for communication according to some examples.

The second data format conversion unit 902B is configured to perform data format conversion on the signaling data at a radio resource control layer (RRC) to obtain designated data, of which the data format is consistent with the signaling data format of the UE.

In some examples, the data format refers to the number of fields, field length, an arrangement order of fields, or meaning of fields in the data.

Examples of the present disclosure may be formed by possible combinations of the above optional technical solutions, which is not described herein.

Figure 12:
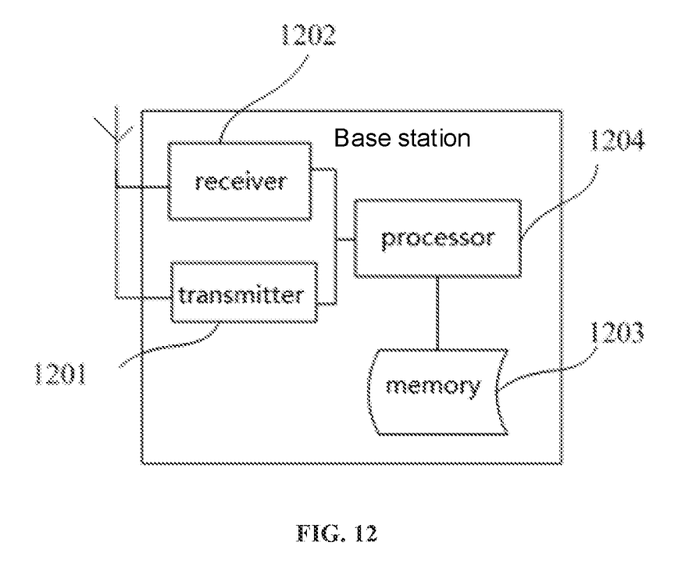
FIG. 12 is a structural diagram showing a base station according to some examples.

FIG. 12 is a structural diagram showing a base station according to some examples. As shown in FIG. 12, the base station includes a transmitter 1201, a receiver 1202, a memory 1203, and a processor 1204 which is connected to the transmitter, the receiver and the memory respectively. Of course, the base station may further include general components such as an antenna, a baseband processing component, an intermediate radio frequency processing component and an input/output device, which is not limited in the examples of the present disclosure. The processor 1204 is configured to implement the method at the base station side in any possible implementation mode provided in the above examples.

Figure 13:
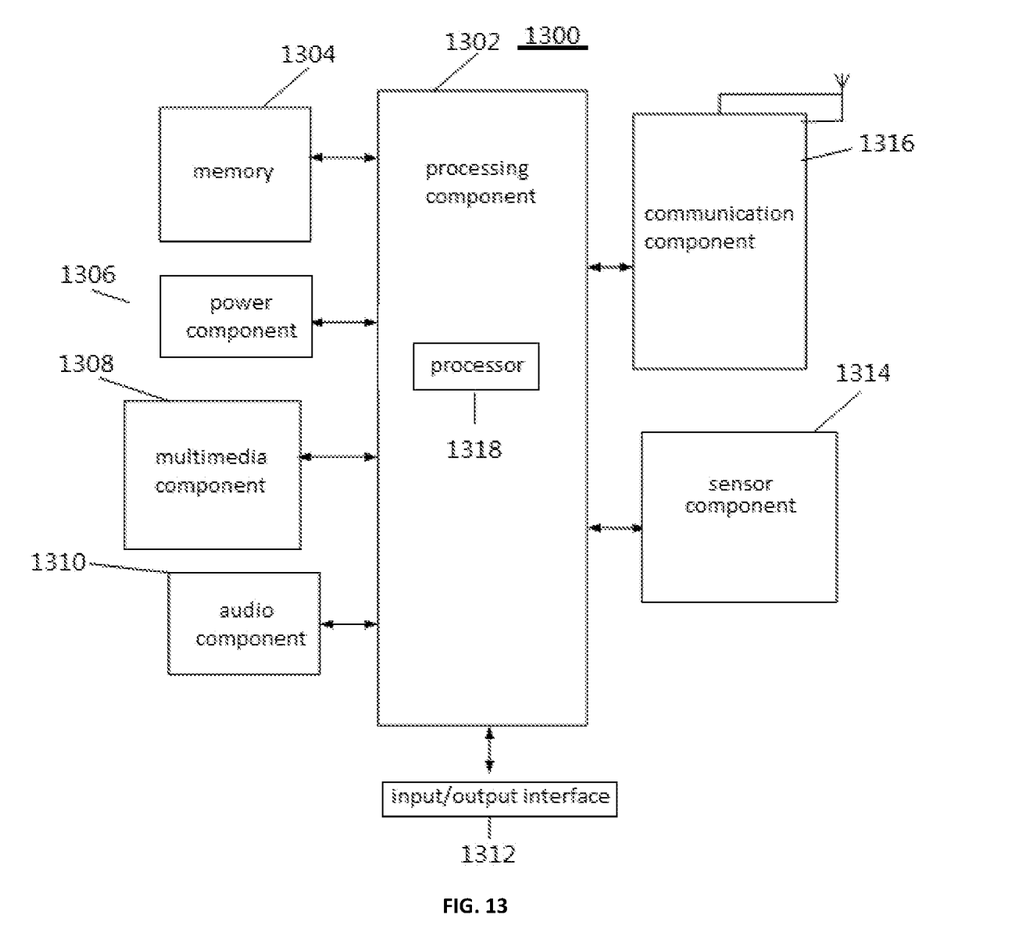
FIG. 13 is a block diagram showing a device for communication 1300 according to some examples.

FIG. 13 is a block diagram showing a device communication according to some examples. For example, the device may be a mobile phone, a computer, a digital broadcast terminal, a messaging device, a gaming console, a tablet device, a medical device, a fitness equipment, a personal digital assistant, and the like.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls the overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, videos, etc. The memory 1304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some examples, the multimedia component 1308 includes a front camera and/or a rear camera. The front camera and the rear camera may receive external multimedia data while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive external audio signals when the device 1300 is in an operation mode, such as a call mode, a recording mode, and a voice recognition mode. The received audio signal may be further stored in the memory 1304 or transmitted via the communication component 1316. In some examples, the audio component 1310 further includes a speaker for outputting audio signals.

The I/O interface 1312 provides an interface between the processing component 1302 and peripheral interface modules, such as a keyboard, a click wheel, buttons, and the like. The buttons may include, but are not limited to, a home button, a volume button, a start button, and a lock button.

The sensor component 1314 includes one or more sensors to provide status assessments of various aspects of the device 1300. For instance, the sensor component 1314 may detect an on/off status of the apparatus 1300, relative positioning of components, e.g., the display device and the mini keyboard of the device 1300, and the sensor component 1314 may also detect a position change of the device 1300 or a component of the device 1300, presence or absence of user contact with the device 1300, orientation or acceleration/deceleration of the device 1300, and temperature change of the device 1300. The sensor component 1314 may include a proximity sensor configured to detect the presence of nearby objects without any physical contact. The sensor component 1314 may also include a light sensor, such as a CMOS or CCD image sensor, used for imaging applications. In some examples, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, or 3G, or a combination thereof. In an example, the communication component 1316 receives broadcast signals or broadcast associated information from an external broadcast management system via a broadcast channel In an example, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some examples, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some examples, a non-transitory computer-readable storage medium including instructions is also provided, such as the memory 1304 including instructions, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

Persons of ordinary skill in the art can understand that all or part of the steps described in the above examples can be completed through hardware, or through relevant software instructed by application stored in a non-transitory computer readable storage medium, such as read-only memory, disk or CD and the like.

The foregoing descriptions are merely examples of the present disclosure, and are not intended to limit the present disclosure. Within the spirit and principles of the disclosure, any modifications, equivalent substitutions, improvements, etc., are within the scope of protection of the present disclosure.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Examples of the present disclosure can be available to those skilled in the art upon consideration of the specification and practice of the disclosure disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only.

What is claimed is:

1. A method for communication, comprising:
   receiving data sent by a user equipment (UE);
   determining a core network which provides a communication service for the UE; and
   when the core network is a next generation core network (NG-Core), performing a data format conversion on the data to obtain designated data wherein the obtained designated data has a data format that is consistent with the NG-core, and sending the designated data to the NG-core; and
   when the core network is a fourth-generation evolved packet core (EPC), sending the data to the fourth-generation EPC, and
   wherein the data format conversion is enabled when the core network is the NG-Core and the data format conversion is disabled when the core network is the fourth-generation EPC, and
   wherein the data is user data, and performing the data format conversion on the data to obtain the designated data comprises:
   performing the data format conversion on the user data at a packet data convergence protocol (PDCP) layer to obtain the designated data, wherein the obtained designated data has the data format that is consistent with a user data format of the NG-Core.

2. The method according to claim 1, wherein the data is signaling data, and performing the data format conversion on the data to obtain the designated data comprises:
   performing the data format conversion on the signaling data at a radio resource control (RRC) layer to obtain the designated data, wherein the obtained designated data has the data format that is consistent with a signaling data format of the NG-Core.

3. The method according to claim 1, wherein the data format refers to at least one of: a number of fields, a field length, an arrangement order of fields, or a meaning of fields in the data.

4. A device for communication, comprising:
   a processor; and
   a memory for storing a processor-executable instruction, wherein
   the processor is configured to:
   receive data from a user equipment (UE); determine a core network which provides a communication service for the UE; and
   when the core network is a next generation core (NG-Core), perform a data format conversion on the data to obtain designated data wherein the obtained designated data has a data format that is consistent with the NG-Core, and send the designated data to the NG-Core; and
   when the core network is a fourth-generation evolved packet core (EPC), send the data to the fourth-generation EPC, and
   wherein the data format conversion is enabled when the core network is the NG-Core and the data format conversion is disabled when the core network is the fourth-generation EPC, and
   wherein the data is user data, and the processor configured to perform the data format conversion on the data to obtain the designated data is further configured to:
   perform the data format conversion on the user data at a packet data convergence protocol (PDCP) layer to obtain the designated data, wherein the obtained designated data has the data format that is consistent with a user data format of the NG-Core.

5. The device according to claim 4, wherein the data is signaling data, and the processor configured to perform the data format conversion on the data to obtain the designated data is further configured to:
   perform the data format conversion on the signaling data at a radio resource control (RRC) layer to obtain the designated data, wherein the obtained designated data has the data format that is consistent with a signaling data format of the NG-Core.

6. The device according to claim 4, wherein the data format refers to at least one of: a number of fields, a field length, an arrangement order of fields, or a meaning of fields in the data.

* * * * *